United States Patent [19]
Burton

[11] Patent Number: 6,017,986
[45] Date of Patent: Jan. 25, 2000

[54] POLYOLEFIN COMPOSITION RESISTANT TO HIGH ENERGY RADIATION, AND ARTICLES PRODUCED THEREFROM

[75] Inventor: Lester P. J. Burton, Wilmington, Del.

[73] Assignee: Montell North America Inc., Wilmington, Del.

[21] Appl. No.: 08/841,014

[22] Filed: Apr. 29, 1997

Related U.S. Application Data

[63] Continuation of application No. 08/674,940, Jul. 3, 1996, abandoned, which is a continuation of application No. 08/414,086, Mar. 31, 1995, abandoned.

[51] Int. Cl.⁷ .................................................... C08K 5/10
[52] U.S. Cl. ...................... 524/313; 524/322; 524/232; 524/251; 524/296; 524/297; 524/269
[58] Field of Search ................................. 524/322, 313, 524/232, 251, 296, 297, 269

[56] References Cited

U.S. PATENT DOCUMENTS

| | | | |
|---|---|---|---|
| 3,645,822 | 2/1972 | Widiger et al. | 524/232 |
| 3,969,434 | 7/1976 | Powell et al. | 524/322 |
| 4,110,185 | 8/1978 | Williams et al. | 204/159.2 |
| 4,274,932 | 6/1981 | Williams et al. | 204/159.2 |
| 4,331,791 | 5/1982 | Rohlfing et al. | 526/125 |
| 4,430,289 | 2/1984 | McKinney et al. | 524/232 |
| 4,431,497 | 2/1984 | Rekers | 204/159.2 |
| 4,467,065 | 8/1984 | Williams et al. | 524/296 |
| 4,530,732 | 7/1985 | Horn | 524/232 |
| 4,563,259 | 1/1986 | Rayner | 524/99 |
| 4,594,376 | 6/1986 | Hamada | 524/101 |
| 4,654,252 | 3/1987 | Doyen | 428/213 |
| 4,675,122 | 6/1987 | Luers et al. | 524/232 |
| 4,701,487 | 10/1987 | Hakim | 524/232 |
| 4,710,524 | 12/1987 | Donohue | 522/75 |
| 4,749,734 | 6/1988 | Williams et al. | 524/102 |
| 4,757,104 | 7/1988 | Nace | 524/322 |
| 4,797,438 | 1/1989 | Kletecka et al. | 524/100 |
| 4,822,666 | 4/1989 | Hudson | 428/224 |
| 4,839,234 | 6/1989 | Kakugo et al. | 524/232 |
| 4,888,369 | 12/1989 | Moore, Jr. | 524/100 |
| 5,041,483 | 8/1991 | Burch | 524/274 |
| 5,077,328 | 12/1991 | Hanura et al. | 524/232 |
| 5,140,073 | 8/1992 | Rolando et al. | 525/240 |
| 5,191,004 | 3/1993 | Maringer et al. | 524/322 |
| 5,319,012 | 6/1994 | Ward et al. | 524/322 |
| 5,331,019 | 7/1994 | Payne, Jr. et al. | 524/232 |
| 5,376,716 | 12/1994 | Nayak et al. | 524/295 |

FOREIGN PATENT DOCUMENTS 0007736  2/1980  European Pat. Off. .

*Primary Examiner*—Peter D. Mulcahy

[57] ABSTRACT

A radiation-resistant polyolefin composition which includes (i) a polyolefin; and (ii) a radiation-stabilizing amount of at least one aliphatic, unsaturated compound having at least one unsaturation site, the compound having a molecular weight of at least 200 and an iodine number of at least 25. Suitable aliphatic, unsaturated compounds include soybean oil, safflower oil, squalene, polybutadiene, a tertiary amine having at least one aliphatic, unsaturated fatty-acid-derived substituent, oleamide, calcium oleate, erucyl erucamide and glycerol monooleate. A saturated mobilizing compound is preferably included in the composition, which can advantageously be used in the manufacture of fibers, films, and medical devices such as syringes, tube assemblies, tissue culture flasks, and packaging film.

6 Claims, No Drawings

POLYOLEFIN COMPOSITION RESISTANT TO HIGH ENERGY RADIATION, AND ARTICLES PRODUCED THEREFROM

This application is a continuation of application Ser. No. 08/674,940, filed Jul. 3, 1996 now abandoned, which is a continuation of application Ser. No. 08/414,086, filed Mar. 31, 1995 now abandoned.

BACKGROUND OF THE INVENTION

This invention relates to a polyolefin composition which contains a polyolefin and at least one unsaturated compound in an amount effective to impart resistance to the deleterious effects of sterilizing radiation upon the polyolefin, as well as articles produced from the composition.

Polyolefins, and in particular, polypropylene, have been used to manufacture articles, such as medical devices and food packaging, which are subjected to ionizing radiation to sterilize them. However, such articles tend to become brittle upon exposure to such high energy radiation. This problem becomes more severe as the surface area of the article increases. Thus, fiber and films are particularly susceptible to embrittlement.

The prior art has attempted to overcome this problem by adding various stabilizers to the polyolefin. For example, U.S. Pat. No. 4,110,185 to Williams et al discloses the addition of a non-crystalline mobilizing additive to a semi-crystalline polyolefin generally. The mobilizing additive is said to increase the free volume of the polymer, and may be selected from hydrocarbon oils, vegetable oils, silicon oils and low molecular weight non-crystalline polymer greases. U.S. Pat. Nos. 4,274,932 and 4,467,065, both to Williams et al, disclose the addition of the mobilizing additive to a semi-crystalline polyolefin having a narrow molecular weight distribution. U.S. Pat. No. 4,749,734 to Williams et al discloses incorporating a heterocyclic hindered amine and the mobilizing additive. These patents do not distinguish between saturated and unsaturated compounds with respect to this mobilizing additive.

U.S. Pat. No. 5,041,483 to Burch discloses the use of cyclic unsaturated rosin esters as odor-suppressing stabilizers for polypropylene compositions. Aliphatic unsaturated compounds are not disclosed.

U.S. Pat. No. 4,888,369 to Moore, Jr. proposes the addition of a synergistic mixture of a hindered amine, a hindered phenolic and a phosphorous-containing compound to polypropylene.

U.S. Pat. No. 5,376,716 to Nayak et al. discloses the addition of triallyl trimellitate to polypropylene or propylene-ethylene copolymers to produce a radiation resistant resin blend.

European Patent Publication No. 7,736 to Rayner et al. discloses that the resistance of polyolefins to the discoloration which occurs as a result of gamma-irradiation could be improved by incorporation of one or more specified hindered amines. U.S. Pat. No. 4,563,259 to Rayner discloses a composition comprising a substantially crystalline polyolefin having a molecular weight distribution ratio of 7.0 or below and containing from 0.1 to 2 weight percent of a hindered amine or its salt. The mobilizing additive of U.S. Pat. No. 4,274,932 can optionally be incorporated into the composition.

U.S. Pat. No. 4,797,438 to Kletecka et al. discloses stabilizing polypropylene using a hindered amine containing a polysubstituted piperazin-2-one moiety or a polyalkylene polyamine having pendant substituted oxo-piperazinyltriazine moieties.

U.S. Pat. No. 4,594,376 to Hamada discloses a propylene polymer composition containing 0.5 to 2 parts by weight of triallyl (iso)cyanurate and/or diallyl(iso)phthalate and, optionally, an organic peroxide.

U.S. Pat. No. 4,822,666 to Hudson discloses a non-woven polypropylene fabric stabilized against ionizing radiation by a long chain aliphatic ester added to the polypropylene prior to formation of the fabric. A specific benzoate ester, hexadecyl 3,5-di-t-butyl-4-hydroxybenzoate, is preferred.

U.S. Pat. No. 5,140,073 to Rolando et al. proposed blending non-crystalline mesomorphous polypropylene and a polymer compatible with the polypropylene, such as polybutylene, rather than adding a non-polymeric radiation stabilizer to the polyolefin.

U.S. Pat. No. 4,431,497 to Rekers discloses polyolefin compositions stabilized with from about 100 to about 10,000 ppm of a stabilizer selected from benzhydrol or a benzhydrol derivative of specified formula.

U.S. Pat. No. 4,710,524 to Donohue discloses polyolefin compositions stabilized with a hindered piperidine compound and another stabilizer additive, preferably a benzophenone precursor.

BRIEF SUMMARY OF THE INVENTION

One aspect of the invention pertains to a radiation-resistant polyolefin composition comprising
(i) a polyolefin; and
(ii) a radiation-stabilizing amount of at least one aliphatic unsaturated, compound having at least one unsaturation site, the compound having a molecular weight of at least 200 and an iodine number of at least 25. Other aspects relate to fibers, films and medical devices manufactured from the radiation resistant polyolefin composition.

DETAILED DESCRIPTION OF THE PREFERRED EMBODIMENTS:

The polyolefin suitable for use in this invention is preferably a homopolymer of propylene, a copolymer of propylene with ethylene in an amount up to 15 weight percent, preferably 3 to 10 weight percent, most preferably 2 to 6 weight percent, or a terpolymer of propylene containing from 1.5 to 5 weight percent, preferably 2–3 weight percent ethylene and 2.5 to 10 weight percent, preferably 4–6 weight percent of $C_{4-8}$ alpha-olefins. The polyolefin is most preferably a propylene polymer having a narrow molecular weight distribution, defined as the ratio of the weight average molecular weight (Mw) to the number average molecular weight (Mn). The Mw/Mn ratio should not exceed 7, and is preferably not greater than 6.

The polyolefin's molecular weight may be narrowed by visbreaking the polymer. The process of visbreaking crystalline polypropylene (or a propylene polymer material) is well known to those skilled in the art. Generally, it is carried out as follows: propylene polymer or polypropylene in "as polymerized" form, e.g., flaked or pelletized, has sprayed thereon or blended therewith, a prodegradant or free radical generating source, e.g., a peroxide in liquid or powder form or absorbed on a carrier, e.g., polypropylene (Xantrix 3024, manufactured by HIMONT U.S.A., Inc). The polypropylene or propylene polymer/peroxide mixture is then introduced into a means for thermally plasticizing and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene containing polymer as well as to reduce the overall molecular weight and thereby increase the MFR relative to the as-polymerized polymer. For example, a polymer with a fractional MFR (i.e., less than 1), or a polymer with a MFR of 0.5–10, can be selectively visbroken to a MFR of 15–50, preferably 28–42, e.g., about 35, by selection of peroxide type, extruder temperature and extruder residence time without undue experimentation. Sufficient care should be exercised in the practice of the procedure to avoid crosslinking in the presence of an ethylene-containing copolymer; typically, crosslinking will be avoided where the ethylene content of the copolymer is sufficiently low.

It has been discovered that it is the amount of unsaturation rather than a specific chemical class which provides the sought-for resistance to embrittlement and discoloration to polyolefins which have been exposed to sterilizing radiation. Thus, compounds having one or more carbon-carbon double bonds (conjugated and non-conjugated), carbon-carbon triple bonds, and/or allenic unsaturation are all encompassed within the ambit of the present invention.

The effective amount of the aliphatic, unsaturated compound will depend on the amount of unsaturation within the compound, which is indicated as its iodine number. A minimum amount of unsaturation (iodine number of 25) is required. A compound having multiple unsaturation sites will typically be more effective than a compound having a single unsaturation site. In general, from 0.25 to 7 parts by weight, preferably 1 to 5 parts, of the aliphatic, unsaturated compound should be added to the polyolefin, based on 100 parts by weight of the polyolefin. The effective amount of an individual compound can be easily determined using the tests discussed in the Examples below.

The molecular weight of the aliphatic, unsaturated compound should be at least 200, and preferably at least 350, to avoid volatility problems during extrusion of the polymer composition.

The following are particularly preferred for use as the aliphatic, unsaturated compound: soybean oil, safflower oil, squalene, polybutadiene having an iodine value of about 470, a tertiary amine having at least one aliphatic, unsaturated fatty-acid-derived substituent, oleamide, calcium oleate, erucyl erucamide and glycerol monooleate. Many of these compounds are commercially available.

Soybean oil is a drying oil extracted from soybeans, has an iodine value of 137–143.

Safflower oil is a drying oil extracted from safflower (carthamus) seed, has an iodine number of about 145.

Squalene is an aliphatic hydrocarbon having six unconjugated double bonds, has an iodine number of about 310, a molecular weight of 423, and is found in shark liver oil.

Polybutadiene can also be used as the aliphatic, unsaturated compound. The polybutadiene can possess significant unsaturation (i.e. an iodine value of about 470) and can contain a variety of cis- and trans unsaturation. For example, polybutadiene containing 70% 1,2 vinyl double bonds, 20% 1,4-trans vinyl bonds, and 10% 1,4-cis vinyl bonds is commercially available and useful in the practice of the present invention. In addition, polybutadiene containing 16–20% 1,2 vinyl double bonds, 44% 1,4-trans vinyl bonds, and 36% 1,4-cis vinyl bonds is suitable as the aliphatic, unsaturated compound, and is also commercially available.

Preferred aliphatic, unsaturated amine compounds include oleamide and erucyl erucamide in addition to tertiary amines having at least one aliphatic, unsaturated fatty-acid-derived substituent. An example of such a tertiary amine includes a commercially available mixture of compounds having two methyl groups and a mixture of fatty acid derived substituents comprising about 22% saturated $C_{16}$ and $C_{18}$, 53% oleic acid, 22% linoleic acid and 3% linolenic acid. The mixture has a calculated iodine value of 86.

In a particularly preferred embodiment, a saturated hydrocarbon oil is also present in the stabilized polyolefin composition. The inventor has discovered that the combination of an aliphatic unsaturated compound and the saturated hydrocarbon oil imparts superior embrittlement resistance to the polyolefin composition, yet which does not suffer from significant discoloration.

The composition of this invention can be prepared by mixing the polyolefin and the aliphatic, unsaturated compound together in a conventional Henschel mixer and then extruding the resulting mixture into pellets.

The polyolefin composition may also include other additives which are conventionally employed in the art, such as internal lubricants, antioxidants, preservatives, fillers and the like. A hindered amine light stabilizer is preferably included in the composition as an antioxidant. A metal stearate such as sodium stearate or calcium stearate is desirably employed as an acid scavenger. Other additives include nucleating agents and colorants, etc.

The radiation resistant composition of the present invention may be manufactured into fiber and film using conventional techniques. It is believed particularly suitable for the production of partially oriented yarn, which may be prepared by (i) spinning the polyolefin composition into an undrawn fiber; and (ii) partially orienting the undrawn fiber. Fabrics, including non-woven fabrics, can also be made from the fibers of the present invention.

The radiation resistant composition of the present invention is believed to have particular utility in the manufacture of medical devices such as syringes, tube assemblies, tissue culture flasks, and packaging film.

Articles prepared from the polyolefin composition may be sterilized by subjecting them to high energy ionizing (electron beam or gamma) radiation. A radiation dosage of 2.5 megarads is sufficient to effectively sterilize shaped articles and any material contained therein, and is the industry standard. However, radiation dosages from about 2.5 to about 5.0 megarads can be applied even though radiation dosages in excess of 2.5 megarads are not necessary to accomplish sterilization.

EXAMPLES

Example 1

The formulations listed in Table I below were blended together using a Henschel mixer for 90 seconds, and then extruded into pellets using a Killion 1.5 inch diameter single screw extruder under nitrogen at a constant temperature profile of 450° F. across all five extruder zones.

The melt flow rate (MFR) of the obtained pellets was determined according to ASTM D 1238, Condition L. An increase in MFR indicates undesirable polymer chain scission.

The color of the obtained pellets was evaluated on the basis of their yellowness index according to ASTM D1925 immediately before and after exposure to cobalt 60 gamma radiation at a dose rate of about 1 Mrad/hour. The pellets' color was also measured after oven-aging at 60° C. at various intervals.

As reported in Table I, soybean and safflower oil are more effective in inhibiting the MFR increase than either Drakeol 34 or Witco 300, which both contain saturated hydrocarbon oils. Compare samples I-3 and I-4 with sample I-2, and compare sample I-7 with samples I-6 and I-8. However, soybean and safflower oils cause a greater degree of discoloration than the saturated compounds.

The unsaturated oil improves the performance of a hindered amine light stabilizer, as shown by comparison of sample I-7 to samples I-5, I-6 and I-8 or sample I-11 to sample I-12.

The unsaturated oil is also effective at low concentrations, as demonstrated by comparing samples I-9 and I-10 to sample I-1.

This Example evaluates the utility of various aliphatic, unsaturated compounds as radiation stabilizers for a visbroken polypropylene composition. The formulations listed in Table II below were blended together and evaluated in general accordance with the procedures of Example I.

As summarized in Table II, compositions containing safflower oil and compositions containing soybean oil exhibited superior inhibition of MFR increase with the least amount of yellowing of the unsaturated compounds evaluated.

The coconut oil is a saturated fatty acid ester and is not effective as a radiation stabilizer. The linseed oil and menhaden oil are highly unsaturated and are the most effective compounds in this series in controlling melt flow. This Example demonstrates that the level of melt flow control is dependent on the level of unsaturation and not on the ester functionality.

TABLE I

Effect of Additives on Irradiated Homopolymer - MFR & Color Changes

|  | I-1 | I-2 | I-3 | I-4 | I-5 | I-6 | I-7 | I-8 | I-9 | I-10 | I-11 | I-12 | I-13 |
|---|---|---|---|---|---|---|---|---|---|---|---|---|---|
| Pro-fax 6501-S[1] | 100 | 100 | 100 | 100 | 100 | 10 | 100 | 100 | 100 | 100 | 100 | 100 | 100 |
| Tinuvin 770[2] |  |  |  |  | 0.1 | 0.1 | 0.1 | 0.1 |  |  | 0.1 | 0.1 | 0.1 |
| Millad 3940[3] |  |  |  |  |  |  |  |  |  |  |  |  | 0.25 |
| Sodium stearate | 0.1 | 0.1 | 0.1 | 0.1 | 0.1 | 0.1 | 0.1 | 0.1 | 0.1 | 0.1 | 0.1 | 0.1 | 0.1 |
| Drakeol 34[4] |  | 4.7 |  |  |  | 4.7 |  |  |  |  | 1 |  | 4.7 |
| Safflower Oil |  |  | 4.7 |  |  |  | 4.7 |  |  | 0.25 | 1 |  |  |
| Soybean Oil |  |  |  | 4.7 |  |  |  |  |  |  |  | 1 |  |
| Witco 300[5] |  |  |  |  |  |  |  | 4.7 |  |  |  |  |  |
| MFR - before irrad. | 5 | 8.7 | 52 | 4.6 | 6.4 | 9.2 | 5.5 | 9.8 | 5.1 | 4.7 | 6 | 4.3 | 9.6 |
| after irrad. | 100 | 140 | 37 | 33 | 51 | 81 | 36 | 123 | 75 | 62 | 81 | 52 | 114 |
| after 2 weeks @ 60° C. | 356 | 194 | 47 | 33 | 45 | 85 | 33 | 101 | 99 | 83 | 65 | 56 | 103 |
| after 4 weeks @ 60° C. | 409 | 238 | 50 | 38 | 57 | 88 | 32 | 105 | 105 | 94 | 75 | 56 | 107 |
| Color: - before irrad. | -13 | -.18 | 0.19 | 1.1 | -1.2 | -0.88 | 1 | 0.74 | -1.2 | -0.88 | -0.3 | -0.23 | -0.69 |
| after irrad. | 0.13 | 0.89 | 4.2 | 4 | 2.3 | 3.2 | 4.9 | 5 | 1.3 | 3.9 | 2.8 | 5.4 | 2.8 |
| after 2 weeks @ 60° C. | 0.39 | 0.87 | 5.2 | 5.6 | 2.2 | 3.1 | 5.1 | 3.3 | 1.6 | 2.4 | 2.3 | 4.6 | 2.4 |
| after 4 weeks @ 60° C. | 0.82 | 0.88 | 8.4 | 8.3 | 3 | 3.9 | 7.8 | 3.8 | 2.1 | 2.6 | 2.7 | 7.3 | 2.9 |

[1]Profax 6501-S polypropylene homopolymer, commercially available from HIMONT U.S.A., Inc.
[2]Tinuvin 770 piperidyl sebacate, a hindered amine, commercially available from Ciba Geigy Corporation.
[3]Millad 3940 dibenzylidene sorbitol, commercially available from Milliken Chemical.
[4]Drakeol 34 saturated hydrocarbon mineral oil, commercially available from Pennzoil Products, Inc.
[5]Witco 300 saturated hydrocarbon mineral oil, commercially available ftom Witco Corporation.

Example II

TABLE II

|  | II-1 | II-2 | II-3 | II-4 | II-5 | II-6 | II-7 | II-8 | II-9 | II-10 | II-11 |
|---|---|---|---|---|---|---|---|---|---|---|---|
| Pro-fax 6801[6] | 100 | 100 | 100 | 100 | 100 | 100 | 100 | 100 | 100 | 100 | 100 |
| Sodium Stearate | 0.1 | 0.1 | 0.1 | 0.1 | 0.1 | 0.1 | 0.1 | 0.1 | 0.1 | 0.1 | 0.1 |
| Tinuvin 770 | 0.1 | 0.1 | 0.1 | 0.1 | 0.1 | 0.1 | 0.1 | 0.1 | 0.1 | 0.1 | 0.1 |
| Millad 3940 | 0.2 | 0.2 | 0.2 | 02 | 0.2 | 02 | 0.2 | 0.2 | 0.2 | 0.2 | 0.2 |
| Lupersol 101 (ppm)[7] | 807 | 367 | 404 | 734 | 844 | 1100 | 232 | 856 | 1640 | 1430 | 1027 |
| Drakeol 34 |  | 1 | 4.7 |  |  |  |  |  |  |  |  |
| Safflower Oil |  |  |  | 1 | 3 | 4.7 |  |  |  |  |  |
| Coconut Oil |  |  |  |  |  |  | 4.7 |  |  |  |  |
| Olive Oil |  |  |  |  |  |  |  | 4.7 |  |  |  |
| Linseed Oil |  |  |  |  |  |  |  |  | 4.7 |  |  |
| Menhaden Oil |  |  |  |  |  |  |  |  |  | 4.7 |  |
| Soybean Oil |  |  |  |  |  |  |  |  |  |  | 4.7 |
| MFR Before Irrad.: | 14 | 10 | 10 | 11 | 11 | 14 | 12 | 12 | 10 | 11 | 12 |
| Pellets Irradiated 5 Megarads: |  |  |  |  |  |  |  |  |  |  |  |
| MFR | 127 | 91 | 108 | 91 | 76 | 65 | 143 | 92 | 50 | 61 | 67 |
| After 2-Weeks @ 60° C. | 97 (101) | 73 | 101 | 75 | 61 | 57 | 112 (113) | 88 | 50 | 67 | 66 |
| Color Before Irrad.: | 2.0 | 2.1 | 4.2 | 5.0 | 3.2 | 5.9 | 2.7 | 7.2 | 36A | 43 | 8.5 |
| Pellets Irradiated 5 Megarads: |  |  |  |  |  |  |  |  |  |  |  |

TABLE II-continued

|  | II-1 | II-2 | II-3 | II-4 | II-5 | II-6 | II-7 | II-8 | II-9 | II-10 | II-11 |
| --- | --- | --- | --- | --- | --- | --- | --- | --- | --- | --- | --- |
| Unaged | 7.3 | 8.6 | 113 | 13.2 | 11.3 | 10.9 | 9.2 | 10.5 | 36.7 | 62 | 16 |
| Aged 2-Weeks @ 60° C. | 15 | 14 | 20 | 36 | 31 | 30 | 33 | 47 | 82 | 106 | 43 |

( ) Figures in parenthesis represent retest.
[6]Pro-fax propylene homopolymer, commercially available from HIMONT U.S.A., Inc.
[7]Lupersol 101 2,5-dimethyl-2,5-di(tert-butylperoxy)hexane peroxide, commercially available from Elf Atochem N.A., Inc.

Example III

The formulations listed in Table III below were blended together and evaluated in general accordance with the procedures of Example I.

Example III demonstrates that a combination of an unsaturated aliphatic compound and a saturated hydrocarbon oil provides a stabilized polyolefin which exhibits less yellowing and a smaller MFR increase than a polyolefin composition stabilized with only the saturated hydrocarbon oil.

An unsaturated fatty acid monoester (III-2) is more effective in controlling melt flow when compared to the unsaturated analogue (III-3).

TABLE III

|  | III-1 | III-2 | III-3 | III-4 |
| --- | --- | --- | --- | --- |
| Pro-fax 6801 | 100 | 100 | 100 | 100 |
| Tinuvin 770 | 0.1 | 0.1 | 0.1 | 0.1 |
| Sodium stearate | 0.1 | 0.1 | 0.1 | 0.1 |
| Millad 3940 | 0.22 | 0.22 | 0.22 | 0.22 |
| Lupersol 101 (ppm) | 550 | 473 | 314 | 490 |
| Drakeol 34 | 4.7 | 3.7 | 3.7 | 3.7 |
| Glycerol monooleate |  | 1 |  |  |
| Glycerol monostearate |  |  | 1 |  |
| Safflower oil |  |  |  | 1 |
| Initial MFR | 13.5 | 11.5 | 11 | 11.6 |
| Initial Color (Yellowness Index) | 2.9 | 6.6 | 10.6 | 0.8 |
| Pellets Irr. 5 mrads |  |  |  |  |
| MFR | 119 (127) | 117 (115) | 163 (163) | 109 (84) |
| After 2-Weeks @ 60° C. | 120 | 100 | 129 (132) | 77 |
| Color (Yellowness Index) | 10.0 | 8.6 | 11.9 | 5.9 |
| After 2-Weeks @ 60° C. | 18 | 24 | 20 | 29 |

( ) Figures in parenthesis represent retest

Example IV

This Example compares the radiation stabilization utility of various aliphatic, unsaturated compounds in a visbroken polypropylene composition. The formulations listed in Table IV below were blended together and evaluated in general accordance with the procedures of Example I.

The trademarked materials set forth in Table IV are defined as follows:

1. Pro-fax PH-060 polypropylene homopolymer, commercially available from HIMONT U.S.A. Inc.
2. Ricon 157 polybutadiene containing 70% 1,2-vinyl double bonds, 20% 1,4-transvinyl bonds and 10% 1,4-cis-vinyl bonds, commercially available from Ricon Resins, Inc.
3. Ricon 131 polybutadiene containing 16–20% 1,2-vinyl double bonds, 44% 1,4-transvinyl bonds and 36% 1,4-cis-vinyl bonds, commercially available from Ricon Resins, Inc.
4. Trilene 65 liquid terpolymer of ethylene, propylene and dicyclopentadiene having an iodine number of 19, commercially available from Uniroyal Chemical Co., Inc.
5. Kenamine T-9992D is a mixture of dimethyl tertiary amines having fatty acid derived substituents in which the substituent composition comprises about 22% saturated $C_{16}$ and $C_{18}$ with 53% oleic acid, 22% linoleic acid. This mixture has a calculated iodine number of 86, and is commercially available from Witco Corporation.

As summarized in Table IV, the polyolefin composition containing the Kenamine T-9992D tertiary amine stabilizing agent (Sample IV-8) provided the best combination of inhibited MFR increase and minimal yellowing. The polyolefin compositions containing Ricon 131 and Ricon 157 provide the best initial control of MFR.

TABLE IV

| COMPONENT | IV-1 | IV-2 | IV-3 | IV-4 | IV-5 | IV-6 | IV-7 | IV-8 | IV-9 | IV-10 | IV-11 | IV-12 |
| --- | --- | --- | --- | --- | --- | --- | --- | --- | --- | --- | --- | --- |
| Pro-fax PH-060 | 100 | 100 | 100 | 100 | 100 | 100 | 100 | 100 | 100 | 100 | 100 | 100 |
| Calcium stearate | 0.1 | 0.1 | 0.1 | 0.1 | 0.1 | 0.1 | 0.1 | 0.1 | 0.1 |  | 0.1 | 0.1 |
| Tinuvin 770 | 0.1 |  |  |  |  |  |  |  |  | 0.1 |  |  |
| Safflower Oil |  |  | 3 |  |  |  |  |  |  |  |  |  |
| Squalene |  |  |  | 3 |  |  |  |  |  |  |  |  |
| Ricon 157 |  |  |  |  | 3 |  |  |  |  |  |  |  |
| Ricon 131 |  |  |  |  |  | 3 |  |  |  |  |  |  |
| Trilene 65 |  |  |  |  |  |  | 3 |  |  |  |  |  |
| Kenamine T-9992D |  |  |  |  |  |  |  | 3 |  |  |  |  |
| Oleamide |  |  |  |  |  |  |  |  | 3 |  |  |  |
| Calcium Oleate |  |  |  |  |  |  |  |  |  | 3 |  |  |
| Erucyl erucamide |  |  |  |  |  |  |  |  |  |  | 3 |  |
| Glycerol momooleate |  |  |  |  |  |  |  |  |  |  |  | 3 |
| Melt Flow Rate (MFR) |  |  |  |  |  |  |  |  |  |  |  |  |
| 0 MRADS |  | 32 | 34 | 24 | 21 | 20 | 19 | 45 | 21 | 25 | 19 | 25 | 26 |
| 2 Weeks, 60° C. |  | 31 | 35 | 27 | 20 | 20 | 17 |  | 22 | 23 | 17 | 26 | 26 |
| 4 Weeks, 60° C. |  | 35 | 36 | 63 | 20 | 20 | 18 |  | 23 | 23 | 17 | 37 | 26 |

TABLE IV-continued

| COMPONENT | IV-1 | IV-2 | IV-3 | IV-4 | IV-5 | IV-6 | IV-7 | IV-8 | IV-9 | IV-10 | IV-11 | IV-12 |
|---|---|---|---|---|---|---|---|---|---|---|---|---|
| 5 MRADS | 200 | 750 | 150 | 180 | 26 | 40 | 500 | 130 | 250 | 240 | 250 | 340 |
| with BHT |  | 1040 | 170 |  | 35 | 55 |  |  |  |  |  |  |
| 2 Weeks, 60° C. | 270 | >1600 | 530 | 500 | >1600 | 230 |  | 120 | 220 | 240 | 220 | 580 |
| 4 Weeks, 60° C. | 260 | >1600 | >1600 | 910 | >1600 | >1600 |  | 120 | 220 | 230 | 210 | 960 |
| 4 Weeks, 60° C., BHT | 260 |  | 1600 | 1000 |  |  |  | 130 | 210 | 240 | 190 | 890 |
| Color |  |  |  |  |  |  |  |  |  |  |  |  |
| (Yellowness Index) |  |  |  |  |  |  |  |  |  |  |  |  |
| 0 Mrads |  | −1.9 | −1.7 | −0.3 | −0.22 | −1.8 | 0.74 | 0.56 | −0.4 | 1.3 | 16 | 4.4 |
| 2 Weeks 60° C. |  | −1.7 | −1.9 | −0.2 | −0.04 | 1.2 | 0.45 |  | 4.9 | 1.8 | 52 | 4.4 | 3.5 |
| 4 Weeks 60° C. |  | −1.3 | −1.5 | 2.2 | 0.01 | 1.2 | 2.3 |  | 7.6 | 3.7 | 63.2 | 1.3 | 2.5 |
| 5 Mrads |  | 1.7 | −0.04 | 1.4 | 6.7 | 8.2 | 8 | 4 | 8.5 | 2.8 | 15 | 0.74 | 1.9 |
| 2 Weeks, 60° C. |  | 4.9 | −0.91 | 6.1 | 21 | 16 | 34 |  | 19 | 43 | 35 | 12 | 1.3 |
| 4 Weeks, 60° C. |  | 5.9 | 0.54 | 1.6 | 22 | 22 | 37 |  | 20 | 50 | 37 | 18 | 2.5 |

Example V

This Example compares the radiation stabilization utility of various aliphatic, unsaturated compounds for a visbroken polypropylene composition. The formulations listed in Table V below were blended together and evaluated in general accordance with the procedures of Example I. Samples V-1 through V-5 were visbroken.

Syringes were injection molded from the compositions using conventional techniques and apparatus. The syringes were evaluated for flange breakage after sterilization (irradiation) as a measure of embrittlement.

Samples V-2 AND V-3, containing safflower oil, were superior in controlling melt flow. Example V-5, containing the a-olefin Neodene 20/24, had the best angle at break and the fewest breaks. Samples V-2 and V-3 also required a larger force to break the flanges than the other samples.

TABLE V

All samples contain NaSt, Tin 770 and Millad 3940

| Formulation | V-1 | V-2 | V-3 | V-4 | V-5 |
|---|---|---|---|---|---|
| Pro-fax PH-180 | 100.0 | 100.0 | 100.0 | 100.0 | 100.0 |
| Pro-fax 6301 |  |  |  |  |  |
| Safflower Oil |  | 1.0 | 2.5 |  |  |
| Neodene 20/24[1] |  |  |  | 2.5 | 4.7 |
| Drakeol 34 | 4.7 |  |  |  |  |
| Melt Flow |  |  |  |  |  |
| Rate (MFR) |  |  |  |  |  |
| - pellets | 17 | 16 | 15 | 17 | 18 |
| - pellets-5 Mrads | 120 | 81 | 59 | 180 | 150 |
| - syringes (0 Mrads) | 31 | 20 | 19 | 44 | 27 |
| - after 3 Mrads | 110 | 70 | 57 | 140 | 120 |
| - after 2 weeks at 60° C. | 100 | 60 | 44 | 120 | 110 |
| - after 10 wks at 60° C. | 93 | 52 | 38 | 120 | 100 |
| - after 5 Mrads | 150 | 96 | 75 | 200 | 160 |
| - after 2 weeks at 60° C. | 160 | 82 | 63 | 200 | 70 |
| - after 6 weeks at 60° C. |  |  |  |  |  |
| - after 10 wks at 60° C. | 148 | 71 | 52 | 180 | 160 |
| Color |  |  |  |  |  |
| (Yellowness Index) |  |  |  |  |  |
| - pellets | −0.22 | −0.10 | 0.97 | −0.82 | −0.93 |
| - pellets-5 Mrads | 3.2 | 4.8 | 3.7 | 1.5 | 1.4 |
| - syringes | −0.75 | −0.18 | −0.05 | −0.56 | −0.62 |
| - after 3 Mrads | −0.31 | −0.16 | −0.40 | −0.55 | −0.63 |
| - after 2 weeks at 60° C. | −0.37 | 0.23 | −0.22 | −0.39 | −0.94 |
| - after 10 wks at 60° C. | Off-White | Yellow | Yellow | Off-White | Off-White |
| - after 5 Mrads | −0.52 | −0.07 | −0.20 | −0.50 | −0.74 |
| - after 2 weeks at 60° C. | −0.38 | 0.30 | −0.06 | −0.83 | −0.85 |
| - after 10 wks at 60° C. |  |  |  |  |  |
| - after 10 wks at 60° C. | Off- | Yellow | Yellow | Off- | Off- |

TABLE V-continued

|  |  |  | White |  | White | White |
|---|---|---|---|---|---|---|
|  | Angle at Break/# of Broken of 8 Tested/Max. Load in Lbs. | | | | | |
| Flange Bend Test 3 Mrads | | | | | | |
| 0 Weeks | 52/8/38 | 32/8/40 | 66/6/42 | 40/8139 | 83/1/36 |
| 2 Weeks | 52/8/38 | 44/8/42 | 44/8/42 | 30/8/35 | 65/5/36 |
| 4 Weeks | 42/8/38 | 30/8/41 | 42/8/41 | 28/8/34 | 49/8/36 |
| 6 Weeks | 46/8/38 | 31/8/41 | 43/8/43 | 29/8/36 | 63/6/37 |
| 10 Weeks | 37/8/37 | 28/8/41 | 38/8/43 | 27/8/34 | 68/7/38 |
| Flange Bend Test 5 Mrads | | | | | |
| 0 Weeks | 42/8/36 | 30/8/40 | 42/8/42 | 27/8/33 | 68/4/36 |
| 2 Weeks | 29/8/33 | 27/8/39 | 37/8/40 | 22/8/31 | 43/8/35 |
| 4 Weeks | 28/8/32 | 26/8/38 | 32/8/40 | 24/8/32 | 43/8/36 |
| 6 Weeks | 25/8/31 | 27/8/39 | 32/8/41 | 22/8/31 | 41/8/35 |
| 10 Weeks | 24/8/30 | 27/8/40 | 32/8/40 | 20/8/30 | 34/8/34 |

[1]Neodene 20/24 $C_{20-24}$ alpha-olefin, commercially available from Shell Chemical Co.

Example VI

This example evaluates the flange bend strength of various compositions after irradiation at 3 and 5 megarads. The formulations listed in Table VI below were blended together, pelletized and formed into syringes using conventional techniques. A different hindered amine light stabilizer (Uvasil 299) was employed. During molding of the syringes, production problems including poor venting, objectionable odor, flange bowing and poor core adhesion were encountered. Nevertheless, as summarized in Table VI, all experimental samples outperformed the two controls with respect to flange break angle and maximum breakage force. Moreover, optimization of the formulation for syringe manufacture is well within the capability of those of ordinary skill in the art without undue experimentation.

TABLE VI

| COMPONENT | Units | VI-1 | VI-2 | VI-3 | VI-4 | VI-5 | VI-6 |
|---|---|---|---|---|---|---|---|
| SA-849[1] | pph | 100 | 100 | 100 | 100 | 100 | 100 |
| Uvasil 299[2] | pph | 0.1 | 0.1 | 0.1 | 0.1 | 0.1 | 0.1 |
| Millad 3940 | pph | 0.18 | 0.18 | 0.18 | 0.18 | 0.18 | 0.18 |
| Sodium stearate | pph | 0.05 | 0.05 | 0.05 | 0.05 | 0.05 | 0.05 |
| Hydrobrite | pph |  | 5 |  |  |  |  |

TABLE VI-continued

| 550[3] | | | | | | |
|---|---|---|---|---|---|---|
| Ricon 131 | pph | | 3 | | | 3 |
| Neodene 20/24 | pph | | | 5 | | |
| Gulftene C30+[4] | pph | | | | 5 | |
| Glycerol monooleate | pph | | | | | 2 |

Angle at Break/# Broken of 8 Tested/Max. Load in lbs.

| Flange Bend Test | 3 Mrads | | | | | |
|---|---|---|---|---|---|---|
| 0 Weeks | | 33/8/36 | 71/4/33 | 81/3/37 | 90/0/32 | 68/6/33 | 84/2/34 |
| 2 Weeks | | 23/8/32 | 36/8/32 | 63/6/68 | 79/4/33 | 40/8/35 | 87/1/36 |
| 3 Weeks | | 19/8/30 | 28/8/31 | 57/7/39 | 62/6/33 | 37/8/35 | 90/0/36 |

| Flange Bend Test | 5 Mrads | | | | | |
|---|---|---|---|---|---|---|
| 0 Weeks | | 20/8/29 | 31/8/30 | 63/8/38 | 60/7/31 | 40/8/33 | 81/3/35 |
| 2 Weeks | | 16/8/27 | 31/8/27 | 35/8/36 | 36/8/30 | 28/8/31 | 67/8/36 |
| 3 Weeks | | 16/8/26 | 21/8/25 | 33/8/35 | 39/8/29 | 26/8/31 | 56/6/35 |

[1]SA-849 random copolymer of propylene and ethylene containing about 4% weight percent ethylene, commercially available from HIMONT U.S.A., Inc.
[2]Uvasil 299 polymethyl propyl 3-oxy[4(2,2,6,6-tetramethyl)piperidinyl] siloxane hindered amine light stabilizer, commercially available from Great Lakes Chemical Corp.
[3]Hydrobrite 550 saturated mineral oil, commercially available from Witco Corp.
[4]Gulftene C30+ polyethylene wax having an unsaturated end group, commercially available from Chevron Chemical Co.

Example VII

This Example compares the radiation stabilization utility of various aliphatic, unsaturated compounds for a visbroken polypropylene composition. The formulations listed in Table VII below were blended together, pelletized and spun into partially and fully oriented yarns, which were then evaluated for tenacity after sterilization (irradiation) as a measure of embrittlement. Tenacity at yield, break at yield, elongation at yield, break at 5% extension and tenacity at 5% extension were tested using an Instron testing apparatus at a cross-head speed of 500 mm/minute with a 7 inch grip separation.

TABLE VII

| | FORMULATION | | | | | |
|---|---|---|---|---|---|---|
| COMPONENT | VII-1 | VII-1 | VII-3 | VII-4 | VII-5 | VII-6 |
| Pro-fax PH-060 | 100.00 | 100.00 | 100.00 | 100.00 | 100.00 | 100.00 |
| Calcium stearate | 0.05 | 0.05 | 0.05 | 0.05 | 0.05 | 0.05 |
| Tinuvin 622 | 0.05 | 0.05 | 0.05 | 0.05 | 0.05 | 0.05 |
| Irganox 168[8] | 0.10 | 0.10 | 0.10 | 0.10 | 0.10 | 0.10 |
| Safflower Oil | 2 | 4 | | | | |
| Chevron C40+[9] | | | 2 | 4 | | |
| Drakeol 34 | | | | | 4 | |

[8]Irganox 168 triaryl phosphite antioxidant, commercially available from Ciba Geigy Corp.
[9]Chevron C40+ α-olefin, commercially available from Chevron Chemical Co.

Based on the percent original undrawn yarn (POY) energy retention after 3 and 5 megarads of irradiation and 6 weeks of accelerated aging, the following formulations are ranked from most irradiation resistant to least:

| Ranking | Sample No. | Additive Amount | Additive |
|---|---|---|---|
| 1 | VII-2 | 4% | Safflower |
| 2 | VII-4 | 4% | Chevron C40+ |
| 3 | VII-5 | 4% | Drakeol 34 |
| 4 | VII-3 | 2% | Chevron C40+ |
| 5 | VII-6 | 0% | — |

It appears that 4% Safflower oil provides the best irradiation resistance at both 3 and 5 megarads for the undrawn yarn studies.

Chevron C40+ appears to have slightly better irradiation resistance than Drakeol 34 at 3 megarads. However, at 5 megarads their irradiation resistance appears to be equal.

All of the formulations containing an additive have better irradiation resistance than the control, which does not contain any oil.

All of the non-irradiated (0 megarads) samples only showed a slight loss in energy after 6 weeks of accelerated aging. The addition of oil at the higher level only showed a slight advantage over the control.

Data was generated on both undrawn (POY) and drawn (FOY) yarns. The results of the drawn yarns showed an extremely high coefficient of variation, which can be attributed to differences in elongation rather than strength.

We claim:

1. A radiation-resistant polyolefin composition consisting essentially of (i) 100 parts by weight of a polyolefin; and
   (ii) a radiation-stabilizing amount of at least one aliphatic, unsaturated compound having at least one unsaturation site, said compound having a molecular weight of at least 200 and an iodine number of at least 25, wherein said radiation-stabilizing amount is from 0.25 to 7 parts by weight of said unsaturated compound, and said aliphatic, unsaturated compound is at least one member selected from the group consisting of soybean oil and safflower oil.

2. The radiation-resistant polyolefin composition of claim 1, wherein said polyolefin comprises a homopolymer or copolymer of propylene.

3. The radiation-resistant polyolefin composition of claim 2, wherein said polyolefin comprises a polypropylene homopolymer having a molecular weight distribution Mw/Mn of not greater than 7.0.

4. The radiation-resistant polyolefin composition of claim 1, wherein said aliphatic, unsaturated compound comprises soybean oil.

5. The radiation-resistant polyolefin composition of claim 1, wherein said aliphatic, unsaturated compound comprises safflower oil.

6. The radiation-resistant polyolefin of claim 1, further comprising at least one saturated mobilizing compound selected from the group consisting of hydrocarbon oils, halogenated hydrocarbon oils, phthalic ester oils, vegetable oils, silicone oils, and low molecular weight non-crystalline polymer greases.

* * * * *

UNITED STATES PATENT AND TRADEMARK OFFICE
CERTIFICATE OF CORRECTION

PATENT NO. : 6,017,986
DATED : January 25, 2000
INVENTOR(S) : Lester P.J. Burton It is certified that error appears in the above-identified patent and that said Letters Patent is hereby corrected as shown below:

Column 5, Table I
Under row heading MFR-before irrad., under column headings 1-3, change "52" to -- 5.2 --
Under row heading Color:-before irrad.:, under column heading I-1, change "-13" to -- -1.3 --

Column 5, Table II,
Under row heading Color Before Irrad.:, under column heading II-9, change "36A" to -- 36.4 --

Column 7, Table II,
Under row heading Unaged, column heading II-3, change "113" to -- 11.3 --

Column 9, Table IV,
Under row heading O Mrads, column heading IV-12, insert -- 9 --
Under the last row heading 4 Weeks, 60° C., column heading IV-3, change "1.6" to -- 7.6 --

Column 10, Table V-continued,
Line 28, under row heading 0 Weeks, column heading V-4, change "40/8139" to -- 40/8/39 --

Signed and Sealed this

Twenty-first Day of August, 2001

Attest:

*Nicholas P. Godici*

NICHOLAS P. GODICI
*Attesting Officer*   *Acting Director of the United States Patent and Trademark Office*